US006480708B1

(12) United States Patent
Tanaka et al.

(10) Patent No.: US 6,480,708 B1
(45) Date of Patent: Nov. 12, 2002

(54) VARIABLE ATTENUATOR, COMPOSITE VARIABLE ATTENUATOR AND MOBILE COMMUNICATION APPARATUS

(75) Inventors: Koji Tanaka, Shigi-ken (JP); Toshifumi Oida, Omihachiman (JP)

(73) Assignee: Murata Manufacturing Co., Ltd. (JP)

(*) Notice: Subject to any disclaimer, the term of this patent is extended or adjusted under 35 U.S.C. 154(b) by 0 days.

(21) Appl. No.: 09/522,204

(22) Filed: Mar. 9, 2000

(30) Foreign Application Priority Data

Mar. 9, 1999 (JP) .......................................... 11-061794

(51) Int. Cl.[7] ................................................ H04B 1/06
(52) U.S. Cl. .................................. 455/249.1; 333/81 R
(58) Field of Search ............................ 455/67.1, 226.1, 455/230, 249.1, 254; 333/81 R, 81 A, 138, 139; 327/308

(56) References Cited

U.S. PATENT DOCUMENTS 5,126,703 A * 6/1992 Kosuga .................... 333/81 R
5,262,741 A * 11/1993 Kitakubo .................. 333/81 R
5,453,721 A * 9/1995 Geiger et al. ............ 333/81 R
5,477,200 A * 12/1995 Ono ......................... 333/81 R
5,502,421 A * 3/1996 Nakahara .................. 333/81 R
5,563,557 A * 10/1996 Sasaki ...................... 333/81 R
5,603,114 A * 2/1997 Tomita .................... 455/249.1
5,909,645 A * 6/1999 Abramsky et al. ....... 455/249.1
6,147,568 A * 11/2000 Souetinov ................. 333/81 R
6,297,709 B1 * 10/2001 Wey et al. ............... 455/249.1

* cited by examiner

*Primary Examiner*—Nay Maung
*Assistant Examiner*—Quochien B. Vuong
(74) *Attorney, Agent, or Firm*—Ostrolenk, Faber, Gerb & Soffen, LLP

(57) ABSTRACT

A compact variable attenuator, composite variable attenuator, and mobile communication apparatus capable of variably controlling attenuation continuously. The variable attenuator includes a first comb line comprising first and second lines which are electromagnetically coupled with a coupling coefficient M, a second comb line comprising third and fourth lines which are electromagnetically coupled with a coupling coefficient M, and first and second diodes connected to the third and fourth lines of the second comb line. A first terminal is connected to one end of the first line and a second terminal is connected to one end of the second line. The first and second diodes are connected between one end of each of the third and fourth lines and a ground with their anodes connected to one end of each of the third and fourth lines, respectively. First and second control terminals for turning the first and second diodes on and off are connected at the junction of other end of the first line and the other end of the third line and at the junction of the other end of the second line and the other end of the fourth line via resistors.

9 Claims, 6 Drawing Sheets

VARIABLE ATTENUATOR, COMPOSITE VARIABLE ATTENUATOR AND MOBILE COMMUNICATION APPARATUS

BACKGROUND OF THE INVENTION

1. Field of the Invention

The present invention relates to a variable attenuator, a composite variable attenuator and mobile communication apparatus.

2. Description of the Related Art

Generally, in mobile communication apparatus such as mobile telephones, variable attenuators have been used to variably attenuate high frequency signals by using switches to select among a plurality of attenuators having different attenuation values.

FIG. 8 shows a prior art variable attenuator for use in a microwave band. A variable attenuator 70 includes an input terminal 71, an output terminal 72, field effect transistors (FET) 731 to 733 and 741 to 743 for switching conduction and cutoff between input and output, and T-type resistance attenuators 751 to 753, each having losses of A (dB), B (dB) and C (dB), respectively. In this configuration, each of the drain electrodes D of the FETs 731 to 733, which work as switches at the input end, is connected to the input terminal 71 via a capacitor C71, while each of the drain electrodes D of the FETs 741 to 743, which work as switches at the output end, is connected to the output terminal 72 via a capacitor C72. Also, the source electrodes S of the FETs 731 to 733 are connected to one end of respective resistors R71 to R73 of the T-type resistance attenuators 751 to 753 via capacitors C73 to C75, respectively; while the source electrodes S of the FETs 741 to 743 are connected to one end of respective resistors R74 to R76 of the T-type resistance attenuators 751 to 753 via capacitors C76 to C78, respectively. Further, the other ends of the resistors R71 to R73 of the T-type resistance attenuators 751 to 753, respectively, are connected to the other ends of the resistors R74 to R76, respectively, to connect their nodes to a ground via resistors R77 to R79, respectively. Further, the gate electrodes G of the FETs 731 to 733 and 741 to 743 are connected to the ground via capacitors C79 to C81 and C82 to C84, respectively, and are connected to control terminals Vc71 to Vc73 and Vc74 to Vc76, respectively, via inductors L71 to L73 and L74 to L76, respectively, for cutting-off high frequencies.

A negative voltage at the same level as the pinch-off voltage of the respective FET to be controlled or 0 V is selectively applied to each of the control terminals Vc71 to Vc76: If 0 V is applied to the control terminals Vc71 and Vc74 in the first route and a negative voltage at the same level as the pinch-off voltage of the FETs 732, 742, 733 and 743 to be controlled is applied to the control terminals Vc72, Vc75, Vc73, and Vc76 in the second and third routes, respectively, the channel resistance between the drain and the source of the FETs 731 and 741 becomes sufficiently lower than the characteristic impedance of the T-type resistance attenuator 751. On the other hand, the channel resistances between the drains and the sources of the FETs 732, 742, 733 and 743 becomes extremely high due to expansion of depletion layers within the channels. As a result, microwaves input from the input terminal 71 pass through only the first route including the T-type resistance attenuator 751, while the second and third routes including the T-type resistance attenuators 752 and 753, respectively, are disabled. Accordingly, attenuation between the input terminal 71 and the output terminal 72 becomes A (dB).

To switch the attenuation between the input terminal 71 and the output terminal 72 to B (dB), 0 V is applied to the control terminals Vc72 and Vc75 in the second route and a negative voltage at the same level as the pinch-off voltage of the FETs 731, 741, 733 and 743 to be controlled is applied to the control terminals Vc71 and Vc74 in the first route, and Vc73 and Vc76 in the third route, to enable only the second route including the T-type resistance attenuator 752. Switching the attenuation to C (dB) is also achieved by a similar operation to the above. The above operations allow variable control of a plurality of attenuations, but discontinuously.

However, the conventional variable attenuator described above has a problem in that the attenuation can not be variably controlled in a continuous manner due its configuration in which it uses switches to select among a plurality of attenuators having different attenuation values.

Also, it tends to require many component parts because the number of FETs that compose a switch in each channel is a number that is a multiple of the number of attenuation steps to be provided. This results in a more complex construction of switches and, further, a more complex configuration of the variable attenuator itself, making the size of the variable attenuator larger and its production cost higher.

SUMMARY OF THE INVENTION

To overcome the above problems, embodiments of the present invention provide a compact variable attenuator, a composite variable attenuator and mobile communication apparatus capable of variably controlling attenuation continuously in order to solve the problems described above.

One embodiment of the present invention provides a variable attenuator which comprises a first comb line consisting of first and second lines which are electromagnetically coupled, and a second comb line consisting of third and fourth lines which are electromagnetically coupled. First and second diodes are connected to the third and fourth lines of the second comb line, the first diode being connected between the third line and a ground with its anode connected to one end of the third line, the second diode being connected between the fourth line and a ground with its anode connected to one end of the fourth line, and the other ends of the first and third lines being connected and the other ends of the second and fourth lines, respectively, which are connected. A first terminal is connected to one end of the first line, and a second terminal is connected to one end of the second line. A first control terminal for turning the first diode on and off is connected to the junction of the other end of the first line and the other end of the third line and a second control terminal for turning the second diode on and off is connected to the junction of the other end of the second line and the other end of the fourth line.

Also, the variable attenuator of the present invention is characterized by being provided with a laminated ceramic substrate comprising a plurality of sheet layers made of ceramic, the ceramic substrate having strip-electrodes which form the first and second lines of the first comb line and the third and fourth lines of the second comb line, wherein the first and second diodes are mounted on the ceramic substrate.

A composite variable attenuator of the present invention is characterized by comprising a plurality of the above variable attenuators, wherein a plurality of variable attenuators are connected in cascade by connecting one end of the second line of a variable attenuator to one end of the first line of an adjacent variable attenuator.

Mobile communication apparatus of the present invention is characterized by using the above variable attenuator.

Also, it is characterized by using the above composite variable attenuator.

According to the variable attenuator of the present invention, since the first and second diodes are connected between one end of each of the third and fourth lines of the second comb line and the ground, it is possible to variably control the resistance of the first and second diodes by variably controlling the voltage being applied to the first and second diodes from the first and second control terminals. As a result, the loss in the first and second lines of the first comb line and that in the third and fourth lines of the second comb line can be variably controlled.

According to the composite variable attenuator of the present invention it is possible to expand the range of attenuation that can be variably controlled as a plurality of variable attenuators are connected in cascade.

According to the mobile communication apparatus of the present invention it is possible to achieve compact mobile communication apparatus, while maintaining receiving balance in the receiving system, because it uses a compact variable attenuator or compact composite variable attenuator.

Other features and advantages of the invention will be understood from the following description of embodiments thereof, with reference to the drawings, in which like references denote like elements and parts.

DESCRIPTION OF EMBODIMENTS OF THE INVENTION

Figure 1:
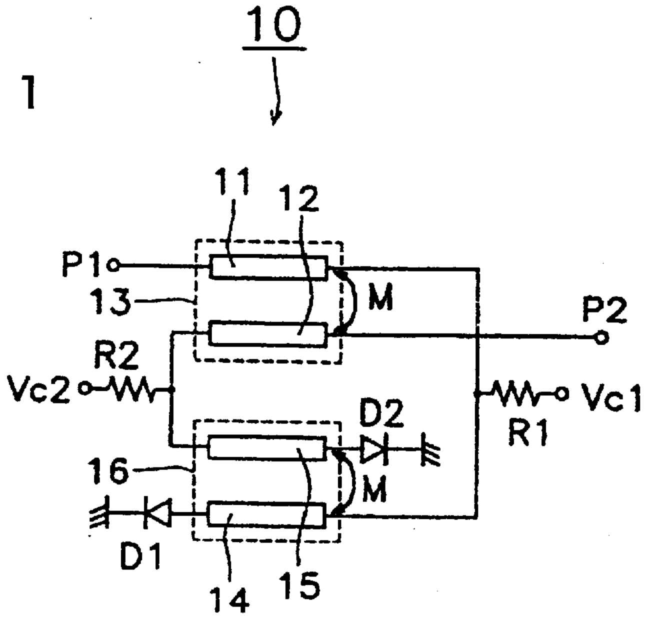
FIG. 1 is a circuit diagram of an embodiment of a variable attenuator of the present invention.

An embodiment of the present invention will be described below by referring to the drawings.

FIG. 1 is a circuit diagram of an embodiment of the variable attenuator of the present invention. A variable attenuator 10 includes a first comb line 13 comprising first and second lines 11 and 12, respectively, which are electromagnetically coupled with a coupling coefficient M, a second comb line 16 comprising the third and fourth lines 14 and 15, respectively, which are electromagnetically coupled with a coupling coefficient M, and first and second diodes D1 and D2, respectively, which are connected to the third and fourth lines 14 and 15, respectively, of the second comb line 16.

A first terminal P1 is connected to one end of the first line 11 of the first comb line 13, and a second terminal P2 is connected to one end of the second line 12. The first diode D1 is connected between one end of the third line 14 and a ground with its anode connected to one end of the third line 14, and the second diode D2 is connected between one end of the fourth line 15 and the ground with its anode connected to one end of the fourth line 15.

The other end of the first line 11 of the first comb line 13, and the other end of the third line 14 of the second comb line 16 are connected. A first control terminal Vc1 for controlling the first diode D1 to turn on and off is connected to the junction of two lines via a resistor R1 .

Also, the other end of the second line 12 of the first comb line 13, and the other end of the fourth line 15 of the second comb line 16 are connected. A second control terminal Vc2 for controlling the second diode D2 to turn on and off is connected to the junction of the two lines via a resistor R2.

Next, operation of the variable attenuator 10 with the above circuit configuration is described. If a positive voltage is applied to the first diode D1 from the first control terminal Vc1 and to the second diode D2 from the second control terminal Vc2, the resistance of the first diode D1 and the second diode D2 is decreased, reducing the coupling coefficient between the first and the second lines 11 and 12, respectively, of the first comb line 13 and the coupling coefficient between the third and the fourth lines 14 and 15, respectively, of the second comb line 16. As a result, if the first terminal P1 is used for input and the second terminal P2 for output, the transmission of high frequency signals from the first terminal P1 to the second terminal P2 via the first comb line 13 and the second comb line 16 is reduced, that is, the attenuation of the variable attenuator 10 is increased.

More specifically, if a positive voltage applied to the first and the second diodes D1 and D2 from the first and the second control terminals Vc1 and Vc2, respectively, is gradually increased from 0 V, the resistance of the first and the second diodes D1 and D2 is gradually decreased. As a result, the magnitude of the high frequency signals sent from the first terminal P1 or the input terminal to the second terminal P2 or the output terminal via the first comb line 13 and the second comb line 16 is gradually reduced, since the attenuation of the variable attenuator 10 is gradually increased.

Accordingly, it is possible to variably control the resistance of the first diode D1 and the second diode D2 by variably controlling the voltage applied from the first control terminal Vc1 and the second control terminal Vc2. This enables the coupling coefficient of the first and second lines 11 and 12, respectively, of the first comb line 13 and the coupling coefficient of the third and fourth lines 14 and 15, respectively, of the second comb line 16 to be variably controlled. As a result, the high frequency signals sent from the first terminal P1 or the input terminal to the second terminal P2 or the output terminal via the first comb line 13 and the second comb line 16 are variably controlled, since the attenuation of the variable attenuator 10 is variably controlled.

The frequency which can be attenuated by the variable attenuator 10 is one with a wavelength which is the sum of the lengths of the first line 11 and the third line 14, or the sum of the lengths of the second line 12 and the fourth line 15. It is noted that the sum of the first line 11 and the third line 14 is equal to the sum of the second line 12 and the fourth line 15. Accordingly, it is possible to control the frequency which can be attenuated by the variable attenuator 10 by changing the sum of the lengths of the first line 11 and the third line 14 or that of the second line 12 and the fourth line 15.

Figure 2:
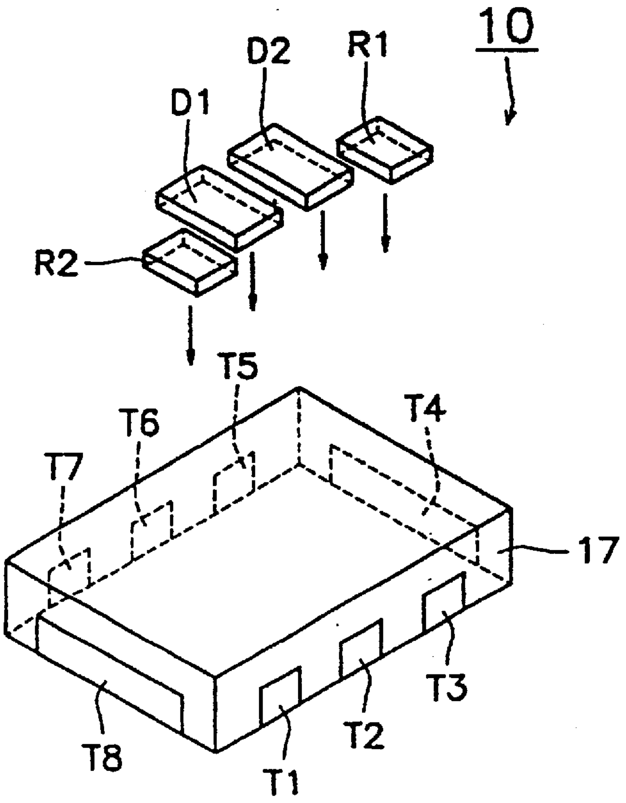
FIG. 2 is a perspective view of the variable attenuator shown in FIG. 1 with some parts thereof shown separately.
Figure 3A:
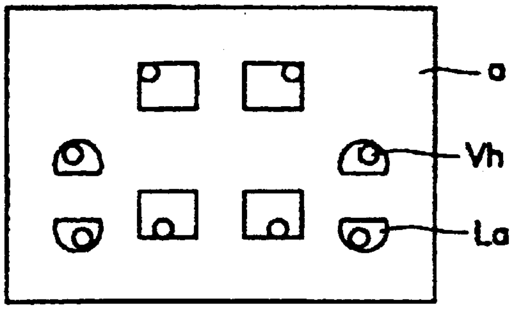
FIGS. 3A to 3F show plan views illustrating the upper surfaces of a first sheet layer to a sixth sheet layer, of a ceramic substrate of the variable attenuator shown in FIG. 1.
Figure 3B:
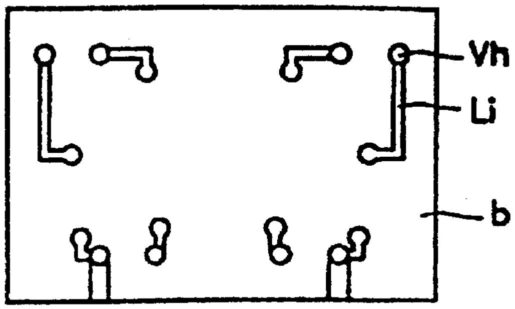
Figure 3C:
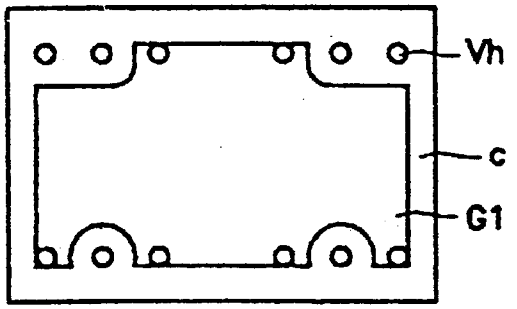
Figure 3D:
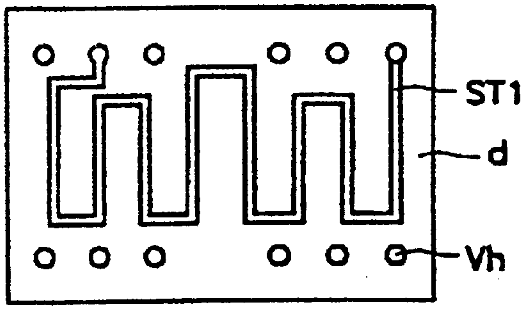
Figure 3E:
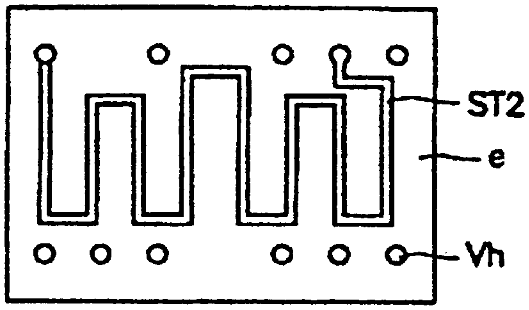
Figure 3F:
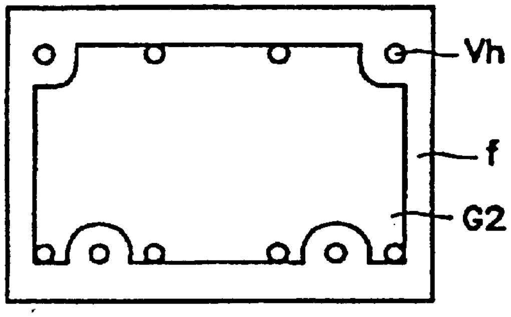
Figure 4A:
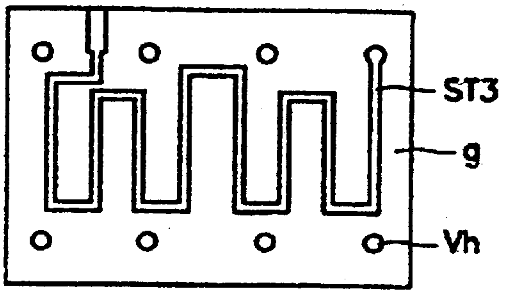
FIGS. 4A to 4C show plan views illustrating the upper surfaces of a seventh sheet layer to a ninth sheet layer, respectively.
Figure 4B:
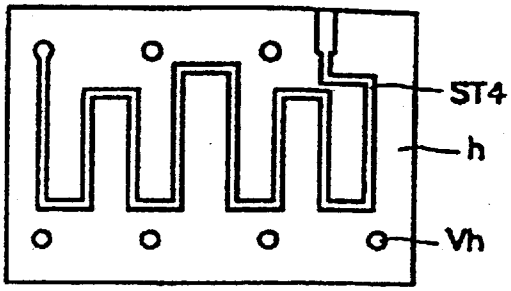
Figure 4C:
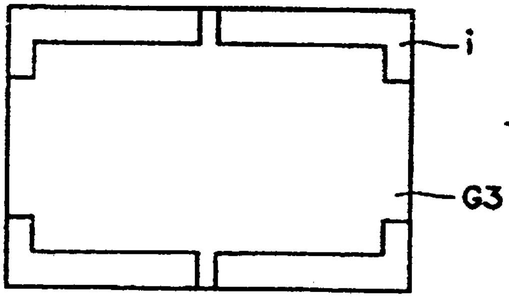
Figure 4D:
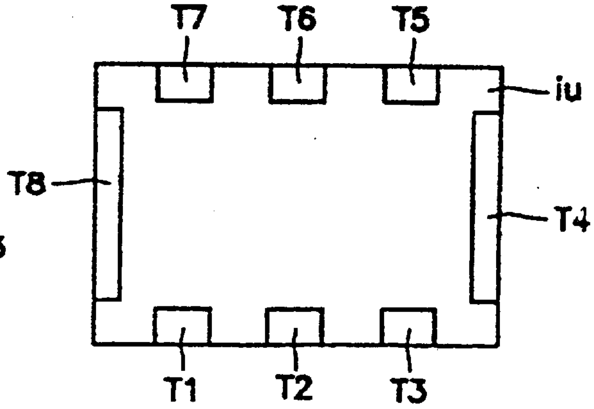
FIG. 4D shows the lower surface of the ninth sheet layer of the ceramic substrate of the variable attenuator shown in FIG. 1.

FIG. 2 is a perspective view of the composite high frequency component shown in FIG. 1, with some parts thereof shown separately. The variable attenuator 10 is provided with a ceramic substrate 17 incorporating strip-line electrodes which comprise the first and the second lines 11 and 12, respectively, of the first comb line 13, the third and the fourth lines 14 and 15, respectively, of the second comb line 16, and ground electrodes (not shown).

On the upper surface of the ceramic substrate 17 are mounted the first and second diodes D1 and D2, and resistors R1 and R2. Also, external terminals T1 to T8 are provided over the sidewalls and the lower surface of the ceramic substrate 17.

In this example, the external terminals T1 and T3 form the first and second terminals P1 and P2, respectively, the external terminals T5 and T7 form the first and second control terminals Vc1 and Vc2, respectively, and the external terminals T2, T4, T6 and T8 form ground terminals.

FIGS. 3A to 3F and FIGS. 4A to 4D are drawings illustrating upper and lower surfaces of dielectric layers comprising the ceramic substrate of the variable attenuator of FIG. 2. The ceramic substrate is formed by laminating and firing the first to the ninth sheet layers a to i in that order. The sheet layers consist of low-firing-temperature ceramics whose main constituents are, for example, barium oxide, aluminum oxide, and silicon dioxide which can be fired at a temperature of 850° C. to 1000° C.

Lands La for mounting the first and second diodes D1 and D2, and the resistors R1 and R2 are formed on the upper surface of the first sheet layer a. Also, a wiring pattern Li is formed on the upper surface of the second sheet layer b.

Further, ground electrodes G1 to G3 are formed on the upper surfaces of the third, sixth and ninth sheet layers c, f and i. Also, strip-line electrodes ST1 to ST4 are formed on the upper surfaces of the fourth, fifth, seventh and eighth sheet layers d, e, g and h, respectively. Further, external terminals T1 to T8 are formed on the lower surface of the ninth sheet layer (referred to as iu in FIG. 4D). Further, via-hole electrodes Vh are formed on the first to eighth sheet layers a to h so as to allow them to pass through each of the sheet layers a to h.

In this example, the strip-line electrode ST1 forms the third line 14 of the second comb line 16, the strip-line electrode ST2 forms the fourth line 15 of the second comb line 16, the strip-line electrode ST3 forms the first line 11 of the first comb line 13, and the strip-line electrode ST4 forms the second line 12 of the first comb line 13.

Also, the first to fourth lines 11, 12, 14 and 15, respectively, the first and second diodes D1 and D2, respectively, and the resistors R1 and R2 are connected within the ceramic substrate 17 by the wiring pattern Li and the via-hole electrodes Vh.

Figure 5:
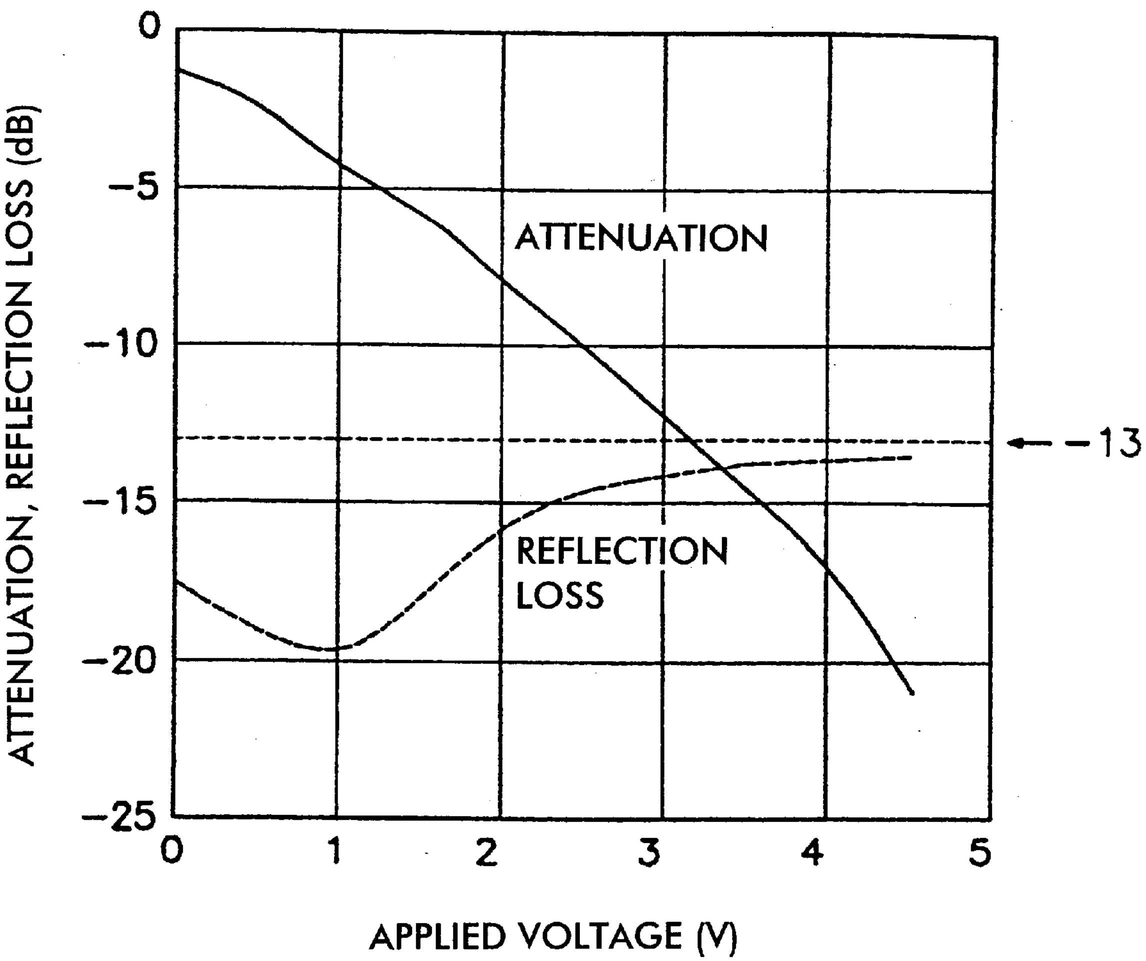
FIG. 5 is a graph illustrating the change of attenuation and reflection loss in response to applied voltage in the variable attenuator shown in FIG. 1.

FIG. 5 is a graph illustrating changes in the reflection loss, when the VSWR (voltage standing-wave ratio) is not more than 1.5, and the attenuation, in response to applied voltage, in the variable attenuator shown in FIG. 1.

The horizontal axis of FIG. 5 shows the voltage applied to the first and second diodes D1 and D2. In this example, the voltage applied to the first and second diodes D1 and D2 from the first and the second control terminals Vc1 and Vc2, respectively, is varied within a range from 0 to 4.5 V to vary the resistance of the diodes D1 and D2.

FIG. 5 demonstrates that by controlling the voltage applied to the first and second diodes D1 and D2 from the first and second control terminals Vc1 and Vc2 within a range from 0 to 4.5 V to control the resistance of the diodes D1 and D2, it is possible to control the attenuation of the variable attenuator 10 within a range from −1.5 to −21.1 dB and to make the reflection loss less than −13 dB when the VSWR is less than 1.5.

According to the variable attenuator of the above embodiment, since the first and second diodes D1 and D2 are connected between one end of each of the third and fourth lines 14 and 15, respectively, of the second comb line 16 and the ground, it is possible to variably control the resistance of the first and second diodes D1 and D2, respectively, by variably controlling the voltage applied thereto. As a result, this enables to the coupling coefficient M of the first and second lines 11 and 12, respectively, of the first comb line 13 and the coupling coefficient M of the third and fourth lines 14 and 15, respectively, of the second comb line 16 to be variably controlled. Accordingly, it is possible to variably control the magnitude of high frequency signals sent from the first terminal or input terminal to the second terminal or output terminal via the first and the second comb lines 13 and 16, respectively, allowing the attenuation of the variable attenuator to be variably controlled, while making the reflection loss not more than −13 dB when the VSWR is not more than 1.5.

The performance of a variable attenuator is conventionally evaluated with a VSWR of not more than 1.5. The acceptable standard performance with that VSWR is a reflection loss of not more than −13 dB.

Since the first and second terminals P1 and P2 are connected to one end of each of the first and second lines 11 and 12, respectively, of the first comb line 13 and the first and second diodes D1 and D2 are connected between one end of each of the third and fourth lines 14 and 15, respectively, of the second comb line 16 and the ground, the first and second terminals P1 and P2 and the first and second diodes D1 and D2 are connected to different comb lines. Accordingly, this makes it possible to easily match the impedance of the first comb line 13 and the second comb line 16 seen from the first and second terminals P1 and P2 to the characteristic impedance of the high frequency circuit of the mobile communication apparatus on which this variable attenuator is mounted during both the on and off periods of the first and second diodes D1 and D2.

Furthermore, as the variable attenuator is constructed from the first and the second comb lines 13 and 16, respectively, and the first and second diodes D1 and D2, respectively, the configuration of the variable attenuator becomes simple, enabling a compact variable attenuator to be made and its production costs to be reduced.

Since the variable attenuator is provided with a laminated ceramic substrate comprising a plurality of sheet layers made of ceramic and the ceramic substrate incorporates strip-electrodes made of copper which form the first and second lines 11 and 12, respectively, of the first comb line 13 and the third and fourth lines 14 and 15, respectively, of the second comb line, it is possible to handle a high frequency band higher than 1 GHz by a wavelength-shortening effect of the ceramic substrate and losses are reduced by the use of copper.

It is also possible to reduce the mounting area of the variable attenuator as the first and second comb lines 13 and 16 are arranged so as to be laminated in the vertical direction of the ceramic substrate. In fact, the mounting area for the present embodiment is 4.5×3.2 $mm^2$.

Figure 6:
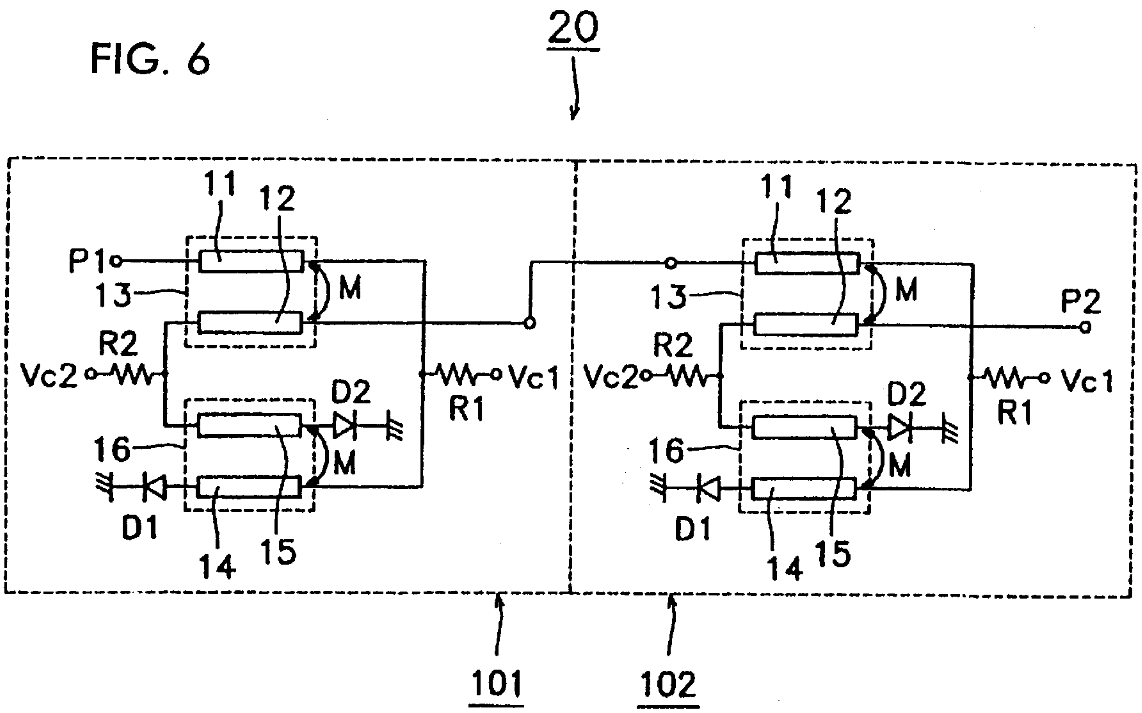
FIG. 6 is a circuit diagram of an embodiment of a composite variable attenuator of the present invention.

FIG. 6 is a circuit diagram of an embodiment of a composite variable attenuator of the present invention. A composite variable attenuator 20 has two variable attenuators (each being the same as the variable attenuator 10 in FIG. 1) connected in cascade: variable attenuators 101 and 102 are connected in cascade by connecting one end of a second line 12 of a first comb line 13 of the variable attenuator 101 to one end of a first line 11 of the first comb line 13 of the variable attenuator 102.

A first terminal P1 is connected to one end of the first line 11 of the first comb line 13 of the variable attenuator 101 and a second terminal P2 is connected to one end of the second line 12 of the first comb line 13 of the variable attenuator 102.

According to the above-described composite variable attenuator 20, it is possible to expand the range of attenuation that can be variably controlled, since a plurality of variable attenuators are connected in cascade. Accordingly, the number of components in the mobile communication apparatus in which this composite variable attenuator is mounted can be reduced and as a result, it is possible to achieve compact mobile communication apparatus.

Figure 7:
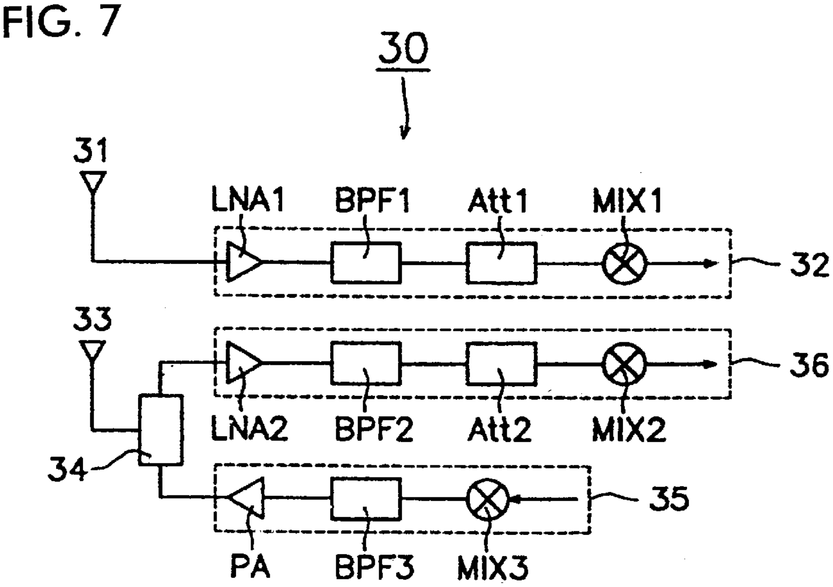
FIG. 7 is a block diagrams of a mobile telephone that is an example of mobile communication apparatus according to an embodiment of the invention.
Figure 8:
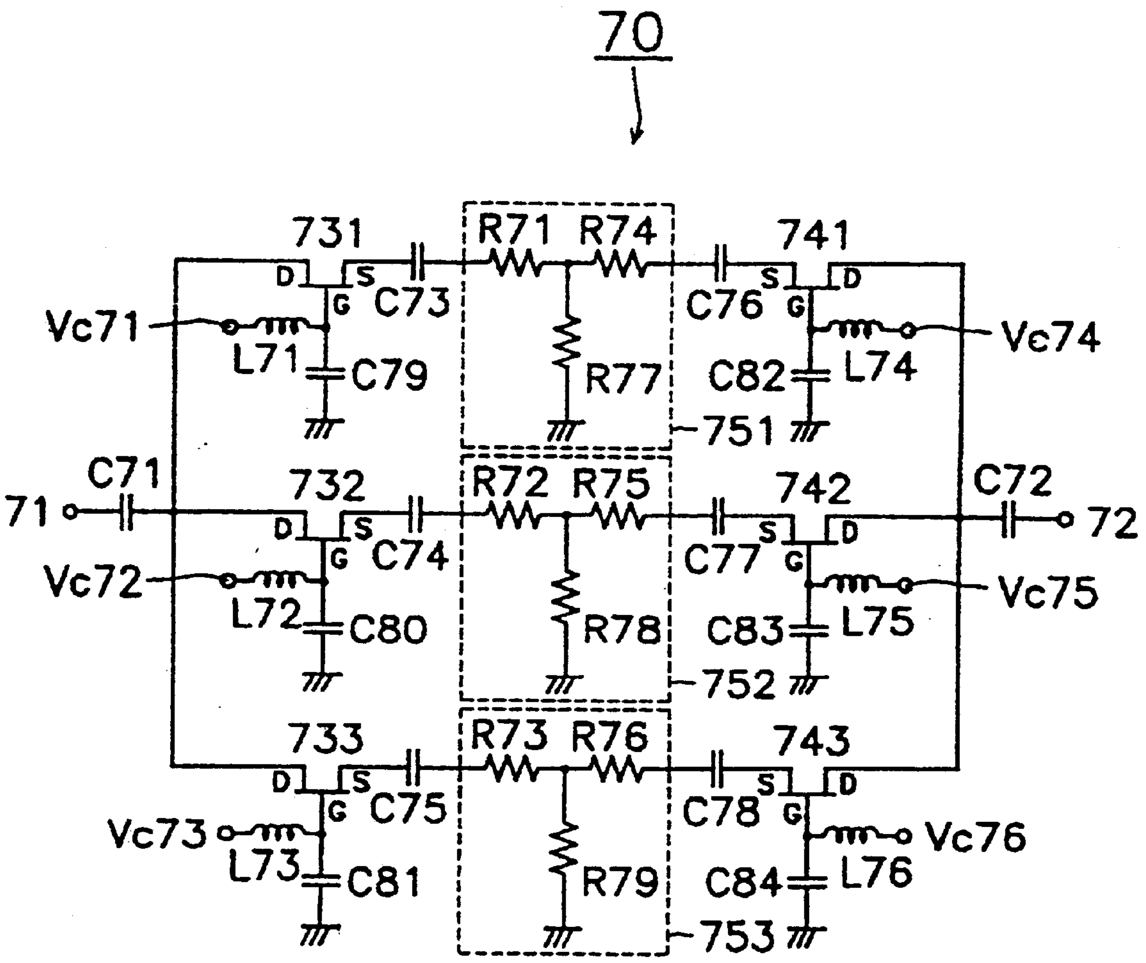
FIG. 8 PRIOR ART
FIG. 8 is a circuit diagram of a conventional variable attenuator.

FIG. 7 is a block diagram of a mobile telephone for W-CDMA (Wideband Code Division Multiple Access) that is one example of mobile communication apparatus. A mobile telephone 30 is provided with a receive-only antenna 31, a first receiving system 32 responding to the antenna 31, a transmit-only antenna 33, a duplexer 34 connected to the antenna 33, a transmitting system 35 and a second receiving system 36, both responding to the antenna 33.

The first and the second receiving systems 32 and 36 include low-noise amplifiers LNA1 and LNA2, band-pass filters BPF1 and BPF2, attenuators Att1 and Att2, and mixers MIX1 and MIX2, respectively, while the transmitting system 35 includes a high power amplifier PA, a band-pass filter BPF3 and a mixer MIX3. In this example, attenuators Att1 and Att2 are used to keep the receiving balance constant.

In the above construction, if the compact variable attenuator 10 shown in FIG. 1 or the compact composite variable attenuator 20 shown in FIG. 6 is used for attenuators Att1 and Att2 included in the first and the second receiving systems 32 and 36, it is possible to achieve a mobile telephone which is compact in size while maintaining a constant receiving balance in the receiving system.

In the above embodiments of the variable attenuator and composite variable attenuator, examples are described in which one end of the first line and one end of second line comprising the first comb line are directly connected to the first and second terminals, respectively, but alternatively they may be connected via capacitors.

In the above description, the first terminal is set as an input terminal and the second terminal as an output terminal but the same effect will be achieved by setting the first terminal as an output terminal and the second terminal as an input terminal.

Further, in the above example, an embodiment of a composite variable attenuator with two variable attenuators connected in cascade is described, but three or more variable attenuators may be connected in cascade. In such an arrangement the greater the number of the variable attenuators the wider the range of attenuation available for variable control.

According to the variable attenuator of the present invention, since the first and second diodes are connected between respective ends of the third and fourth lines of the second comb line and the ground, it is possible to variably control the resistance of the first and second diodes by variably controlling the voltage applied to the first and second diodes. As a result, this enables the coupling coefficient M of the first and second lines of the first comb line and the coupling coefficient M of the third and fourth lines of the second comb line to be variably controlled. Accordingly, it is possible to variably control the amount of high frequency signals sent from the first terminal to the second terminal via the first and the second comb lines or the amount of high frequency signals sent from the second terminal to the first terminal via the second and the first comb lines, allowing the attenuation of the variable attenuator to be variably controlled, while making the reflection loss less than −13 dB when the VSWR is less than 1.5.

Also, since the first and second terminals are connected to respective ends of the first and second lines of the first comb line and the first and second diodes are connected between respective ends of the third and fourth lines of the second comb line and the ground, the first and second terminals and the first and second diodes are connected to different comb lines. Accordingly, this makes it possible to easily match the impedance of the first comb line and the second comb line seen from the first and second terminals to the characteristic impedance of the high frequency circuit of the mobile communication apparatus on which this variable attenuator is mounted during both the on and off periods of the first and second diodes.

Furthermore, as the variable attenuator is constructed from the first and the second comb lines and the first and second diodes, the configuration of the variable attenuator becomes simple, enabling a compact variable attenuator to be made and its production costs to be reduced.

Since the variable attenuator is provided with a laminated ceramic substrate comprising a plurality of sheet layers made of ceramic, and the ceramic substrate incorporates strip-electrodes which form the first and second lines of the first comb line and the third and fourth lines of the second comb line, it is possible to handle a high frequency band by a wavelength-shortening effect of the ceramic substrate.

It is possible to expand the range of attenuation that can be variably controlled by connecting a plurality of variable attenuators in cascade. Accordingly, the number of components in the mobile communication apparatus in which this composite variable attenuator is mounted can be reduced and as a result, it is possible to achieve compact mobile communication apparatus.

Employment of a compact variable attenuator enables mobile communication apparatus which is compact while maintaining a constant receiving balance in the receiving system.

Employment of a compact composite variable attenuator enables mobile communication apparatus which is compact while maintaining a constant receiving balance in the receiving system.

While particular embodiments of the present invention have been shown and described, numerous variations and alternate embodiments will occur to those skilled in the art without departing from the fair spirit and scope of the invention.

What is claimed is:

1. A variable attenuator comprising:

a first comb line comprising first and second lines which are electromagnetically coupled;

a second comb line comprising third and fourth lines which are electromagnetically coupled;

a first terminal connected to one end of said first line;

a second terminal connected to one end of said second line;

first and second diodes connected to said third and fourth lines of said second comb line, said first diode being connected between said third line and a ground with an anode of said first diode connected to one end of said third line, the second diode being connected between said fourth line and the ground with an anode of said second diode connected to one end of said fourth line, the other ends of said first and third lines being connected, and the other ends of said second and fourth lines being connected;

a first control terminal connected to the junction of said other end of said first line and said other end of said third line for controlling said first diode to turn on and off; and a second control terminal connected to the junction of said other end of said second line and said other end of said fourth line for controlling said second diode to turn on and off.

2. The variable attenuator according to claim 1 wherein said variable attenuator is comprised in a laminated ceramic substrate comprising a plurality of sheet layers made of ceramic, the ceramic substrate having strip-electrodes which form said first and second lines of said first comb line and said third and fourth lines of said second comb line, and said first and second diodes are mounted on the ceramic substrate.

3. A mobile communication apparatus comprising a transmitting circuit and a receiving circuit, said variable attenuator according to one of claims 1 and 2 being connected to said transmitting and receiving circuits.

4. A mobile communication apparatus according to claim 3, wherein said variable attenuator is comprised in said receiving circuit.

5. A mobile communication apparatus according to claim 4, wherein said apparatus has a pair of receiving circuits, each said receiving circuit having a respective said variable attenuator arranged for maintaining a receiving balance between said pair of receiving circuits.

6. A composite variable attenuator comprising a plurality of variable attenuators according to one of claims 1 and 2, wherein a plurality of said variable attenuators are connected in cascade by connecting said second terminal of one of said variable attenuators to said first terminal of another of said variable attenuators.

7. A mobile communication apparatus comprising a transmitting circuit and a receiving circuit, said composite variable attenuator according to claim 6 being connected to said transmitting and receiving circuits.

8. A mobile communication apparatus according to claim 7, wherein said composite variable attenuator is comprised in said receiving circuit.

9. A mobile communication apparatus according to claim 8, wherein said apparatus has a pair of receiving circuits, each said receiving circuit having a respective said composite variable attenuator arranged for maintaining a receiving balance between said pair of receiving circuits.

* * * * *